Jan. 18, 1955 N. E. BLANKE ET AL Re. 23,926

LOCKING DEVICE

Original Filed May 3, 1949

Nathan E. Blanke
& Hilland J. Sands

BY

Oldham & Oldham
attorneys

United States Patent Office

Re. 23,926

Reissued Jan. 18, 1955

23,926

LOCKING DEVICE

Nathan E. Blanke and Hillard J. Sands, Cleveland, Ohio, assignors to The Harvard Manufacturing Company, Cleveland, Ohio, a corporation of Ohio Original No. 2,575,651, dated November 20, 1951, Serial No. 91,046, May 3, 1949. Application for reissue October 19, 1953, Serial No. 387,085

6 Claims. (Cl. 5—299)

Matter enclosed in heavy brackets [ ] appears in the original patent but forms no part of this reissue specification; matter printed in italics indicates the additions made by reissue.

Our invention relates to improvements in furniture and in particular to beds.

The principal object of our invention is to provide a quick and easy means for securely attaching and locking a cross rail in and with a bed leg with attached side rail.

A further object of the invention is to provide a means of the class described that permits of the easy and secure assembling and setting up of a bed frame complete without the use of tools except an ordinary hammer.

Other objects and advantages of the use of the invention will become apparent from the description and drawings herein, in which.

In the drawings.

Figure 1:
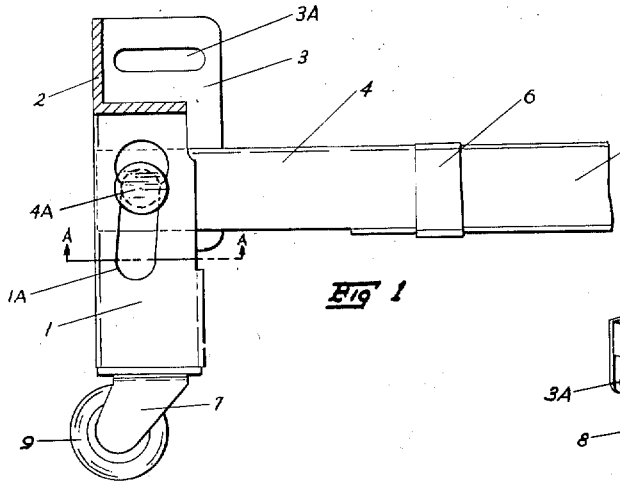
Fig. 1 is a view in elevation of the invention, with a part of the side rail cut away.
Figure 4:
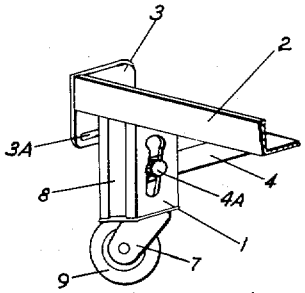
Fig. 4 is a view in perspective of an assembly of the invention, showing a cross rail assembled with a bed leg, provided with a caster and a side rail attached both rails shown in segments.
Figure 2:
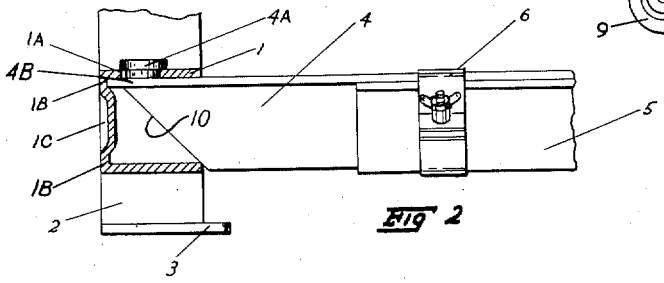
Fig. 2 is a view of the invention looking at it from the inside, taken partly on cross-section line A—A as shown in Fig. 1.
Figure 3:
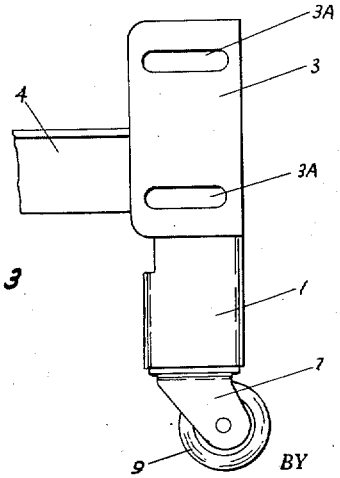
Fig. 3 is a view in elevation of the leg with caster and the outer end of the side rail attached to such leg and showing in particular the plate on the end of the side rail with slots for adjustment and attaching bed ends and providing width adjustment thereof.

1 is a bed leg with caster 9 in horn 7 and the nearly vertical slot 1A, *which has a uniform width section and an enlarged end portion,* in its outer flange[,]. 1B and 1C refer to the form of the face [, or middle portion] 8 of one side of the leg *1, 1C* [1—1C] referring to the slightly recessed portion and 1B to the channel extending lengthwise on the inside of either side of such recessed or middle portion of the face, the end 4B of one part of the cross rail 4 engaging in one of such channels when fixed in position on and in the leg 1[,]. 4A is a stud, *or extension member* fixed integral on the outside surface and near the end of the cross rail 4 and engages in the slot 1A as shown[,], 4A being driven slightly downward in 1A, and 4B engaging in the channel 1B, until the cross rail 4 is firmly fixed in and with the leg 1. 2 is a side rail *which has a base leg and is* firmly attached *thereby* on and to the top of the leg 1, having a normally perpendicularly extending plate 3, with horizontally directed slots 3A, fixed permanently on its outer end. *The top of the leg 1 is of no greater width laterally of the bedframe than the base leg of the side rail 2.* 5 is the other part of the cross rail and joined with 4, to form a complete cross rail by means of the *clamp* [claim] 6, which permits of the adjustment in length of such cross rail.

From the foregoing description and drawing will be readily understood the manner and method of using the invention in the assembling of a bed frame complete for use, however, a further explanation may clarify any misunderstanding of the use of the invention as follows: the caster provided bed leg *has* [having] an elongated slot extending in a lengthwise and a somewhat diagonal position in relation to the edge of the leg, and the end of the cross rail [which] may have a stud, with an enlarged head[, the]. *The* stud is inserted in the slot and forced downward by means of pressure and light blows with a hammer.

By reason of the diagonal or slanting form of the slot 1A and the engaging of the end 4B of rail 4 in channel 1B, cross rail 4 is held firmly against the inside of the leg face, thus holding the leg 1 and the cross rail 4 together and making a tight assembly resistant to torque and forces applied from any normal direction of load.

The end of one face or side of the cross rail 4 is cut off, usually, at an angle starting a short distance from the end of the cross rail, as indicated at the surface 10. Such end 10 of the cross rail 4 is in the edge of the cross rail 4 not directly received in one of the channels or grooves 1B formed in the leg 1, and this cut-off of the end of the cross rail facilitates seating same in the channel 1B.

Also plate 3, attached firmly to side rail 2, provides means of attaching upright parts, such as, arm rest, bed end, etc. as desired. Slots 3A in plate 3 provide means of adjustment in width in conjunction with possible length adjustment of cross rail 4 and clamp 6, so that any mattress, spring or other structure or fixed dimension imposed or rested on side rail 2 may be held securely.

From the foregoing it will be observed that the entire assembly provides novel and practical means of compact design embodying use of a caster leg and means of holding a caster in place, to provide height and pleasing design and means to receive a bed assembly, a cross rail to provide means of giving adjustable width to assembly, slotted plate providing means of attaching other structure thereto and side rail to provide means of a platform upon which to rest seating or bedding, all assembled as needed or required without bolts or other fasteners and without tools except possibly a hammer.

We have shown and described our invention in a desired and useful form and structure however, adaptations in its use may necessitate modifications without departing from the basic features or spirit of the invention.

What we claim as new and desire to secure by Letters Patent is:

[1. A bed frame comprising a caster equipped bed leg with attached side rail, one flange of said leg having an elongated slot opening extending lengthwise of said leg and somewhat diagonally in relation to the outer edge of said leg, the middle portion of said leg being slightly recessed to form an inside channel along each side of said middle portion, said channels extending lengthwise of said leg.]

[2. In a device of the class described, the structure described in claim 1, in combination with a cross rail provided with a stud on its outside surface adjacent to the end and adapted to engage in said slot, said cross rail having one flange projecting slightly beyond the said stud, said cross rail projection adapted to engage in one of said channels to coact with said leg and cross rail to effect an assembly of said leg and cross rail as shown and described and for the purposes specified.]

[3. In a device of the class described in claim 2, a slotted plate attached firmly to an end of said side rail, said plate being a means for attaching upright parts to the bed frame, said plate providing adjustment in width of such upright parts.]

4. In a frame, a leg of substantially U-shape in cross section and having a base face and a pair of side faces, one of said side faces having a *completely enclosed* slot therein *spaced from the margins thereof and* which slants slightly inwardly of said leg towards said base face *and has a uniform width section therein,* said leg having a vertically extending channel formed therein at the corner between said slotted side face and said base face, a rail member, and a stud on said rail member and protruding therefrom, said stud being engaged with said slot and being movable downwardly thereof to force an end of said rail member to abut against said channel to secure said rail member tightly to said leg.

[5. In a frame, a leg of substantially U-shape in cross section, and having a base face and a pair of side faces, one of said side faces having a slot therein which slants slightly inwardly of said leg towards said base face, a rail member, and a stud on said rail member and protruding therefrom, said stud being engaged with said slot and being movable downwardly thereof to force an end of said rail member against the inner surface of said base face.]

[6. In a frame, a leg having a base face and a side face with a slot therein which slants slightly inwardly of said leg towards said base face, a rail member, and a stud on said rail member and protruding therefrom, said stud being engaged with said slot and being movable with relation thereto to force an end of said rail member into tight association with said leg.]

[7. A frame as in claim 4 wherein said rail member has a tapered end which is snugly engaged by said side faces upon said rail member being engaged with said leg.]

[8. In a bed frame, a leg of substantially U-shape in section, a rail, an extension member on said rail, and engaging means on said leg in engagement with said extension member, said engaging means and extension member having wedged engagement forcing a portion of said rail against a portion of said leg to aid in securing said rail and leg in fixed relation.]

[9. A frame as in claim 6 wherein said leg has a channel formed in its base face and the end of said rail member is seated in said channel to aid in snugly engaging said leg and said rail member.]

*10. In a bedframe, a leg of substantially U-shape in section, a rail having two sections in angular relation to each other, and an extension member on one section of said rail, said leg having a slot in one side thereof receiving said extension member, said slot and extension member having wedged engagement forcing a portion of said rail against a portion of said leg to aid in securing said rail and leg in fixed relation, said other section of said rail having an end portion engaging the other side of said leg to aid in retaining said rail in solid engagement with said leg.*

*11. In a bedframe, a leg of substantially U-shape in section having opposed sides, a rail having two sections in angular relation to each other, and an extension member on one section of said rail, said leg having a vertically inclined slot receiving said extension member, said slot and extension member having sliding engagement to force a portion of said rail against a portion of said leg to aid in securing said rail and leg in fixed relation, said other section of said rail having a tapered end engaging the other side of said leg to aid in retaining said rail in solid engagement with said leg.*

*12. In a bedframe, a pair of side rails having base legs, a pair of legs of substantially U-shape in section and each having opposed sides and a base portion, cross rail means, and extension members on said cross rail means adjacent each end thereof, each of said legs having an enclosed vertically inclined slot in one side thereof spaced from the margins of such side and receiving said extension member, said slot and extension member having sliding engagement to force portions of said cross rail means against a portion of each of said legs to aid in securing said cross rail means and legs in fixed relation, said legs each having an open lower end for receiving a caster therein, said legs having tops to which said side rails are secured, said tops of said legs being no greater in width laterally of the bedframe than said base legs of said side rails whereby a member carried by said base legs can extend downwardly therefrom between said base legs and normally thereto.*

*13. In a bedframe, a side rail, a leg of unitary construction and substantially U-shape in section and having opposed sides and a base portion, a cross rail extending into said leg towards said base portion and an extension member on said cross rail adjacent an end thereof, said leg having a vertically inclined enclosed slot in one side thereof spaced from the margins of such side and receiving said extension member in a section of the slot, said slot and extension member having sliding engagement to force a portion of said cross rail against a portion of said leg to aid in securing said rail and leg in fixed relation, said leg having a top and having an open lower end for receiving a caster therein, said side rail being secured to the top of said leg.*

*14. In a frame, a leg of substantially U-shape in cross section and having a base face and a pair of side faces, one of said side faces having a slot therein which slants slightly inwardly of said leg towards said base face, said leg having a vertically extending channel formed therein at the corner between said slotted side face and said base face, a rail member, and a stud on said rail member and protruding therefrom, said stud being engaged with said slot and being movable downwardly thereof to force an end of said rail member to abut against said channel to secure said rail member tightly to said leg, said rail member having an end portion which is snugly engaged by the other of said side faces upon said rail member being engaged with said leg.*

References Cited in the file of this patent or the original patent

UNITED STATES PATENTS

| | | |
|---|---|---|
| 105,771 | Benjamin | July 26, 1870 |
| 757,924 | Hirsh | Apr. 19, 1904 |
| 1,566,709 | Wasserman | Dec. 22, 1925 |
| 1,694,940 | Herz | Dec. 11, 1928 |
| 1,715,070 | Kusterle | May 28, 1929 |